July 3, 1951        V. T. WHITLOW        2,559,487
TOW BAR

Filed June 21, 1948        2 Sheets-Sheet 1

Verlin T. Whitlow
INVENTOR.

BY *Clarence A. O'Brien*
*and Harvey B. Jacobson*
Attorneys

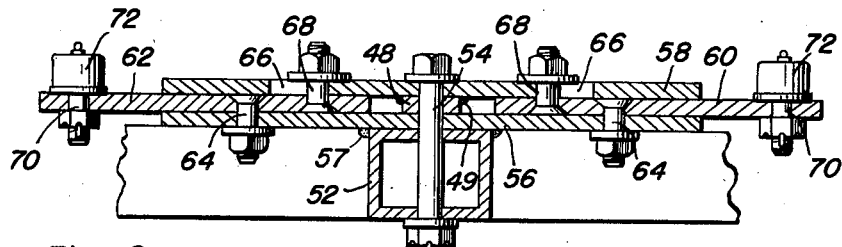
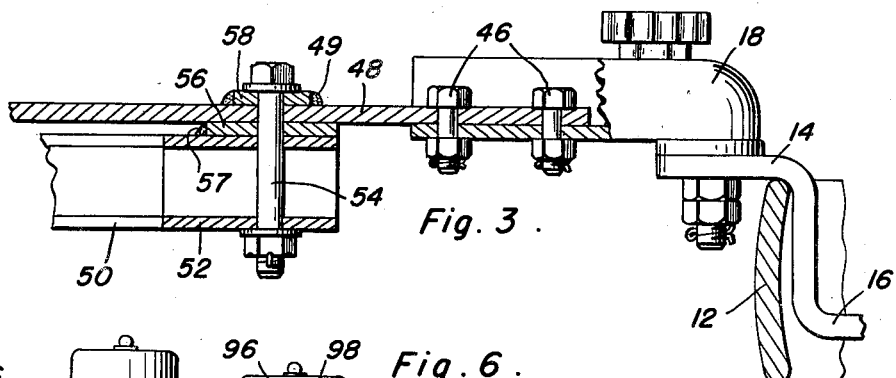
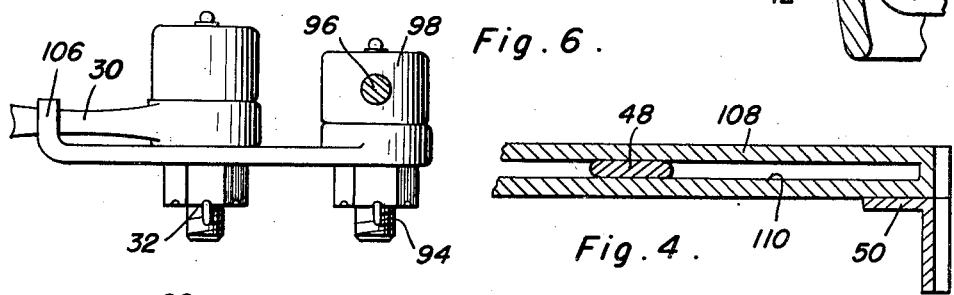
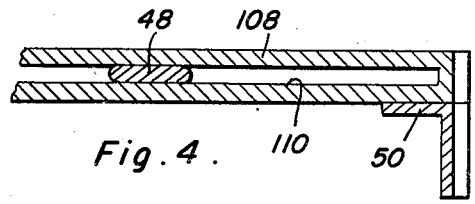
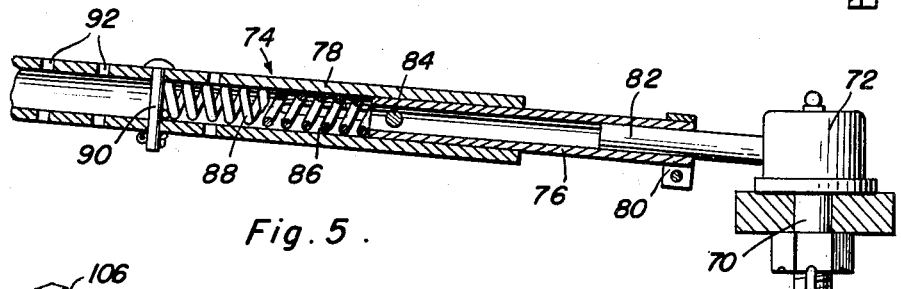
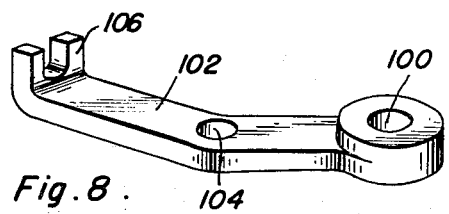

Patented July 3, 1951

2,559,487

UNITED STATES PATENT OFFICE 2,559,487

TOW BAR

Verlin T. Whitlow, Poplar Bluff, Mo.

Application June 21, 1948, Serial No. 34,225

8 Claims. (Cl. 280—33.55)

This invention comprises novel and useful improvements in a tow bar and more specifically pertains to a vehicle especially designed for towing and steering a trailer, such as a farm tractor from a towing vehicle such as a truck or car.

The primary objects of this invention are to provide an appliance which may be readily applied to or removed from the rear bumper or frame of a towing vehicle and may be applied to the front axle and steering gear mechanism of various conventional forms of farm tractors and the like for towing and steering the farm tractor and causing the same to closely track and follow its towing vehicle.

The objects of the invention are generally attained by a coupling hitch or linkage which may be detachably clamped to a trailer hitch or otherwise secured to the frame at the rear of a towing vehicle and may be likewise directly coupled to the axle of the farm tractor to be towed and wherein there is provided a steering linkage for connection with the steering gear of the farm tractor for operating the steering thereof in conformity with turns of the towing vehicle.

An important feature of the invention resides in the provision of a pair of towing brackets which may be secured to the front axle of various types of farm tractors and which brackets may be selectively engaged by a special form of protective bumper for the farm tractor when operating under its own power, or by the arms of the tow bar when the farm tractor is to be towed by a vehicle.

A further feature of the invention resides in the provision of a towing mechanism for coupling a farm tractor to a towing vehicle for towing and steering the farm tractor, wherein there is provided a novel control linkage so connected with the drawbar of the towing device as to automatically operate the steering rods of the farm tractor for guiding the same and causing the farm tractor to track the towing vehicle.

Yet another feature of the invention resides in the provision of an apparatus as set forth in the preceding paragraphs wherein a novel connecting arm is applied to the steering rod ends for easy attachment or removal therefrom whereby the steering mechanism may be operated by the tow bar mechanism.

Yet another feature of the invention resides in the provision of a tow bar construction as set forth in the foregoing objects and features, wherein there is provided a resilient connection between the steering arms of the farm tractor and the drawbar of the tow bar, whereby excessively sharp turns of the towing vehicle will not disadvantageously effect or damage the steering mechanism of the farm tractor nor injure the connecting linkage of the tow bar.

And a final important feature and object of the invention resides in the provision of an appliance as set forth hereinbefore, which shall be of light weight, capable of easy attachment to or removal from a towing vehicle and a farm tractor by one person, wherein there is no necessity for altering or modifying the construction of the farm tractor for applying the same, wherein the tow bar will accommodate itself to irregularities in the surface over which the farm tractor and towing vehicle are traveling, and which shall be sturdy, durable and highly efficient for the purposes intended.

These, together with various ancillary features and objects of the invention, which will later become apparent as the following description proceeds, are attained by this device, a preferred embodiment of which has been illustrated by way of example only in the accompanying drawings, wherein:

Figure 2 is a vertical transverse sectional detail view, taken upon an enlarged scale, substantially through the plane of the section line 2—2 of Figure 1, and showing the construction of part of the steering linkage of the attachment;

Figure 3 is a further sectional detail view taken substantially on the plane of the section line 3—3 of Figure 1 and showing details of construction of the coupling member of the tow bar;

Figure 4 is a fragmentary vertical transverse sectional detail view taken substantially on the plane of the section line 4—4 of Figure 3 and illustrating a lateral guide brace for the swivelling draw bar of the tow bar appliance;

Figure 5 is a vertical longitudinal sectional detail view taken upon an enlarged scale substantially on the plane of the section line 5—5 of Figure 1 and illustrating in particular certain features of construction of a steering connecting link of the appliance;

Figure 6 is a vertical transverse sectional view taken substantially upon the plane of the section line 6—6 of Figure 1 and illustrating the manner by which the steering mechanism of the appliance is coupled to the steering arm of the tractor;

Figure 8 is a perspective view of a link forming a part of the invention and by means of which the steering mechanism of the appliance is connected to the steering mechanism of the farm tractor.

Figure 1:
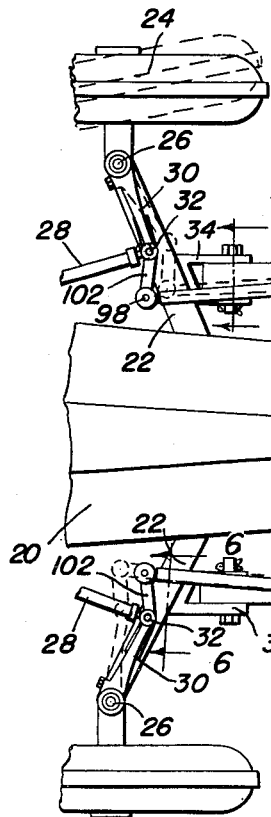
Figure 1 is a fragmentary top plan view showing the towing appliance connected with the rear end portion of a towing vehicle and the front end portion of a conventional form of farm tractor.

Referring now more specifically to the accompanying drawings, wherein like numerals designate similar parts throughout the various views, attention is directed first to Figure 1 wherein there is indicated at 10 a portion of any suitable type of towing vehicle, such as a passenger car, truck or the like, and which is provided with the customary rear bumper 12, and having a trailer coupling bracket 14 secured thereto. As shown in Figure 3, the bracket 14 may rest upon the top of the bumper 12, and may have a portion 16 thereof extending forwardly for mounting upon any suitable portion of the frame of the towing vehicle, in a manner not shown and forming in itself no part of this invention. It is, of course, to be understood that the coupling bracket 14 may be of any desired construction and may, in fact, be of various conventional forms known and now upon the market.

Chosen for the purposes of illustrating the principles of the invention, a coupling 18 of a conventional and known type is illustrated by means of which a farm tractor 20 of various conventional types, the well known Ford or Ferguson tractors being suitable for the purposes of this invention, is to be coupled to the towing vehicle.

As is well known, this tractor is provided with the customary sloping front axles 22, and has its front wheels 24 suitably mounted for steering movement about kingpins 26 carried by the axles, through the agency of the customary tractor steering arms 28 by means of the usual spindle arms 30. These spindle arms are swivelled or pivoted to the steering links 28 as by pivot pins 32.

Figure 7:
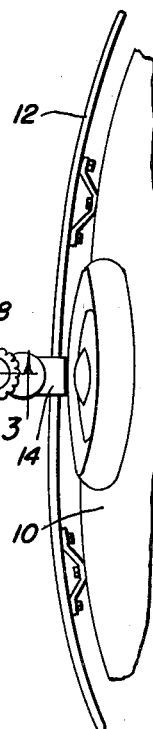
Figure 7 is a further vertical transverse sectional detail view taken substantially upon the plane of the section line 7—7 of Figure 1 and illustrating the manner in which the tow bar is applied to a bracket forming a part of this invention and secured to the front axle of a farm tractor.
Figure 9:
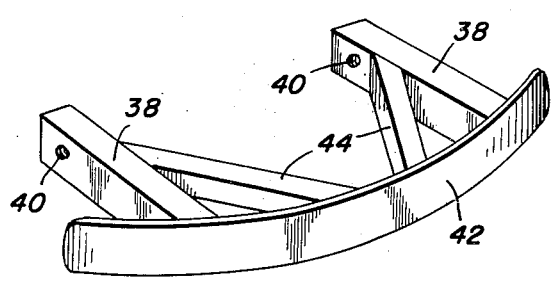
Figure 9 is a perspective view of a suitable form of replacement bumper which may be attached to the farm tractor and mounted upon the tow bar brackets secured to the axle of the farm tractor.

For the purposes of this invention, there are suitably secured to the sloping front axles 22, a pair of U-shaped brackets 34, which are attached to the axles in any desired manner, and have their forwardly extending arms apertured to receive a fastening bolt or pin 36, as shown clearly in Figures 1 and 7. It is contemplated that there may be selectively secured upon the pins 36 of the brackets 34, the arms of the tow bar appliance forming the subject matter of this invention, or a form of detachable bumper indicated in Figure 9, with which the farm tractor may be provided when the coupling device is not attached thereto. This bumper may consist of the support arms 38 of suitable construction, and which are provided with fastening apertures 40, for the reception of the above-mentioned bolt or pin 36. Rigidly attached in any desired manner to the front ends of the support arms 38 is an arcuately shaped front tractor or vehicle bumper 42 and suitable braces 44 serve to reinforce the connection of the bumper to the support arms and to strengthen this assembly for installation and removal as a unit from the farm tractor.

As will be now best seen by reference to Figures 1 and 3, the conventional form of coupling hitch 18 has rigidly attached thereto as by bolts 46, a rearwardly extending drawbar 48 which transmits the pull of the towing vehicle to the appliance and hence to the farm tractor.

A V-shaped frame formed preferably of box girder or of channel iron construction, and having legs 50 extending rearwardly, is pivotally connected to the drawbar 48 at its front end portion 52, by a suitable fastener such as a bolt and nut 54, as will be readily seen from Figures 1, 2 and 3. A transversely extending base plate 56, is rigidly secured to the upper surface of the member 52 as by welding 57 and extends laterally from the sides thereof, the above-mentioned drawbar 48 overlying this plate and being pivotally connected thereto by the above-mentioned bolt 54. Disposed above the base plate 56 and in parallelism therewith, is a top plate 58 which is coextensive with the plate 56. This top plate 58 constitutes a steering link for operating the steering mechanism of the appliance as set forth hereinafter. As will thus be seen, the top plate 58 and the drawbar 48 welded thereto as at 49, the base plate 56 and the tow bar frame member 52 are all pivotally connected together by the above-mentioned fastener 54. A pair of steering levers 60 and 62, are positioned between the opposite ends of the upper and base plates 58 and 56, for pivotal movement with respect thereto, these levers being secured to the base plate 56 as by means of countersunk fastening bolts 64 which are disposed intermediate the ends of the levers 60 and 62. The top plate 58 is provided with longitudinally disposed slots 66, and countersunk fasteners such as the bolts or rivets 68 are secured to the steering levers 60 and 62 and are slidable in the slots 66.

At their outer extremities, the steering levers 60 and 62 are provided with connecting pins 70, of a well known drilled or tubular construction for reception of a conventional form of lubricating fitting 72, for connection with the forward ends of flexible steering connecting links 74.

As will be best seen by reference to Figure 5, these connecting links 74 consist of telescoping, non-rotatable but longitudinally slidable inner and outer tubular members 76 and 78, respectively, the forward end of the inner member 76 being adjustably clamped as by a conventional form of split clamp 80, and in a longitudinally adjustable manner upon a rod 82 received therein, the other end of this rod being coupled to the pin 70. A transversely disposed guide and stop pin 84 is received in a diametrical bore in the inner member 76, and has its extremities extending through longitudinally disposed oppositely positioned slots 86, see Figure 5, of the outer member, whereby these members are prevented from rotating relative to each other but are permitted a limited longitudinal movement against the opposition of a compression spring 88 seated between the inner end of the inner member 76 and an adjustable stop or anchor in the form of a pin 90 selectively received in a plurality of sets of oppositely disposed apertures 92 formed in the outer member. The rear end of the outer member 78 may be provided with a similar adjustable connection corresponding to that of 80 and 82 at the front end of the inner member, whereby the outer member may be pivotally connected to a pivot pin 94 through the agency of a rod 96, see Figure 6, and which connection is provided with the customary lubricating fitting 98.

The pivot pin 94 is secured to and extends through an aperture 100 at one extremity of a steering lever 102, as shown in Figures 6 and 8, which lever is provided with an aperture 104 intermediate its ends which aperture is adapted to receive the above mentioned tractor steering rod pin 32, this lever 102 being further provided at its other extremity with an upwardly extending bifurcated lug 106 which is adapted to embrace the tractor steering arm 30.

As shown in Figures 1 and 6, the rearwardly extending legs 50 of the V-shaped frame of the drawbar are adapted to be detachably connected by the pins 36, see Figure 7, with the towing brackets 34 above mentioned. Intermediate their ends, the legs 50 have suitably attached thereto a longitudinally slotted guide bar 108, the slot being indicated at 110 therein. Received in this slot and, therefore, slidable laterally of the drawbar arms 50, is the rear end portion of the drawbar 48, this slot thus providing means for guiding the end of the drawbar, limiting the lateral movement of the same by engagement of the drawbar with the ends of the slot, and restricting the vertical movement of the drawbar.

From the foregoing, it is thought the manner of installing the device and connecting the same for operative engagement with the towing vehicle and a farm tractor will be readily understood. The coupling hitch 18 mounted upon the drawbar 48 of the tow bar, is engaged upon the tow bar bracket 14 of the towing vehicle. Next, the ends of the arms 50 are pivoted by means of the pins 36 in the drawbar brackets 34 previously secured to the axles 22 of the tractor 20, the bumper 42 being removed for this purpose. Now, the levers 102 are mounted with the bifurcated lugs 106 straddling and embracing the steering arms 30 of the tractor with the pivot 104 of the levers receiving the steering pin 32. The device is now ready for use, and a farm tractor may be towed at any desired rate of speed, safely, without the necessity of a driver or operator therein, by any suitable towing vehicle such as a passenger car or truck or another tractor.

The operation of the towing and steering mechanism is as follows:

When the towing vehicle desires to make a turn, the drawbar 48 pivoted to the rear end of the towing vehicle assumes a different angular position with respect to the drawbar arms 50 and the rigidly attached base plate 56 mounted thereon, as shown in dotted lines at 112 in Figure 1. By means of this lateral movement of the drawbar 48, the top plate 58 which is rigidly attached and carried thereby, likewise assumes a different angular position as indicated by the dotted lines at 114 in Figure 1. This results in an arcuate movement of the fasteners 68 which are carried by the steering levers 60 and 62, and which thus move in the longitudinal slots 66, causing an oscillating movement of the levers 60 and 62 in opposite directions about their pivots 64 carried by the base plate 56. This opposite movement from their normally aligned position, is indicated in dotted lines at 61 and 63 in Figure 1. Thus, the steering connecting links or rods 74 carried by the outer extremities of the levers 60 and 62 are thus moved in reverse directions, one lever operating the tractor steering arm in one direction and the other lever operating the other steering arm in the other direction, it being understood that the parts are so proportioned as to cause the tractor wheels to accurately follow or track the steering vehicle.

It should be here noted that the compression spring construction disclosed in Figure 5 for normally retaining the steering connecting rods 74 in a normal position or length, will permit longitudinal yielding of the rods, either to lengthen or shorten the same, within the limits permitted by the ends of the slots 86 within which the stop pin 84 may travel. This permits additional movement of the steering levers 60 and 62, even though the tractor steering arms 30 are at their limit of movement, thus preventing damage or breakage of the tractor steering mechanism when the towing vehicle makes an abnormally or excessively sharp turn. Moreover, the longitudinal yielding of the steering connecting rods allows the device to accommodate itself to uneven terrain over which the same passes, it being understood that the irregular terrain will frequency twist or distort the tow bar construction whereby the connecting links 74 will necessarily vary in their length.

It is to be understood that if desired safety chains or other suitable safety means may be employed to additionally connect the tow bar construction to the bumper or other part of the framework of the towing vehicle to minimize any damage due to accidental breakage or disengagement of the coupling 18.

It is to be further specifically noted that ample provision exists in the manipulation of the anchor pin 90 in the apertures 92, and the adjustment of the terminal rod 82 in the sleeves 76 by means of the split clamps 80, to enable the steering connecting links to be accommodated to different dimensions and conditions arising from the association of the towing vehicle to its trailer.

From the foregoing, the construction and operation of the device will be readily understood together with the manifested advantages arising therefrom and further explanation is believed to be unnecessary.

However, since numerous modifications and equivalents will readily occur to those skilled in the art, after a consideration of the foregoing specification and accompanying drawings, it is not desired to limit the invention to the exact construction shown and described, but all suitable modifications and equivalents may be resorted to falling within the scope of the appended claims.

Having described the invention, what is claimed as new is:

1. A tow bar for towing and steering farm tractors comprising a tow bar having a frame engageable with the frame of a tractor to be towed, a drawbar pivoted to said tow bar frame and connectable to a towing vehicle, a base plate rigidly secured to said tow bar, a pair of steering levers pivoted intermediate their ends to said base plate on opposite sides of the drawbar, a top plate rigidly connected to said drawbar, one end of said steering levers being connected to opposite ends of said top plate, and connecting links terminally secured to said steering levers and attachable to the steering linkage of a tractor's front wheels.

2. The combination of claim 1, wherein said connecting links are pivoted to the ends of connector links, said connector links having intermediate apertures engageable with tractor steering arm pins and having bifurcated lugs engageable with tractor steering arms.

3. The combination of claim 1, wherein each of said connector links includes telescoping sleeves, and longitudinally adjustable terminals on the opposite ends of said sleeves.

4. The combination of claim 3, including a longitudinally slidable, non-rotatable connection between said sleeves, and resilient means housed within one sleeve and yieldingly urging said sleeves apart.

5. The combination of claim 1, wherein said top plate, drawbar, tow bar frame and base plate are pivotally connected by a common pivot.

6. A combined tow bar and steering attachment for coupling a farm tractor to a towing vehicle, comprising a tow bar having a frame, means for coupling said frame to the front axle of a farm tractor, a drawbar having means for attachment to the rear frame of a towing vehicle, a pivot oscillatably connecting said drawbar to said tow bar frame, a steering linkage carried by said attachment for actuating the steering mechanism of a tractor in coordination with steering of the towing vehicle, said linkage including steering levers pivoted to said tow bar frame, connecting rods having their ends engaging one end of said levers, fastening means for attaching said connecting rods to the steering mechanism of a tractor, and an actuating means rigidly mounted on said drawbar and engaging the other end of said steering levers for simultaneous oscillation thereof in opposite directions.

7. The combination of claim 6, wherein said actuating means includes a plate swingable on said pivot, cooperating slots and pins movable therein connecting said steering levers to said plate.

8. The combination of claim 7, comprising a laterally slotted brace on said tow bar frame, said drawbar being rearwardly extended in said lateral slot for guided oscillation therein.

VERLIN T. WHITLOW.

REFERENCES CITED

The following references are of record in the file of this patent:

UNITED STATES PATENTS

| Number | Name | Date |
| --- | --- | --- |
| 2,180,257 | Rollins | Nov. 14, 1939 |
| 2,417,338 | Williams | Mar. 11, 1947 |